United States Patent
Evans

[15] 3,653,124
[45] Apr. 4, 1972

[54] WALL EDGE TRIMMER FOR HARD SURFACE FLOORING

[72] Inventor: Richard J. Evans, Lancaster, Pa.
[73] Assignee: Armstrong Cork Company, Lancaster, Pa.
[22] Filed: Oct. 12, 1970
[21] Appl. No.: 79,725

[52] U.S. Cl.............................................................30/293
[51] Int. Cl.......................................................B26b 29/02
[58] Field of Search...................................30/293, 294, 287

[56] References Cited

UNITED STATES PATENTS

| | | | |
|---|---|---|---|
| 2,772,474 | 12/1956 | Hill | 30/293 |
| 3,363,314 | 1/1968 | O'Brien | 30/287 X |
| 3,395,453 | 8/1968 | Prater | 30/293 |
| 3,482,310 | 12/1969 | Paterson | 30/293 |

Primary Examiner—Theron E. Condon
Assistant Examiner—J. C. Peters
Attorney—Clifford B. Price

[57] ABSTRACT

The tool has two guiding edges and a cutter for trimming hard surface material to fit against a wall surface. The tool is designed to force and hold the hard surface material with a radium bend at the corner of the floor and wall surface. The radius bend is necessary because a sharp right angle bend will cause breaking of the hard surface flooring.

1 Claim, 2 Drawing Figures

PATENTED APR 4 1972
3,653,124
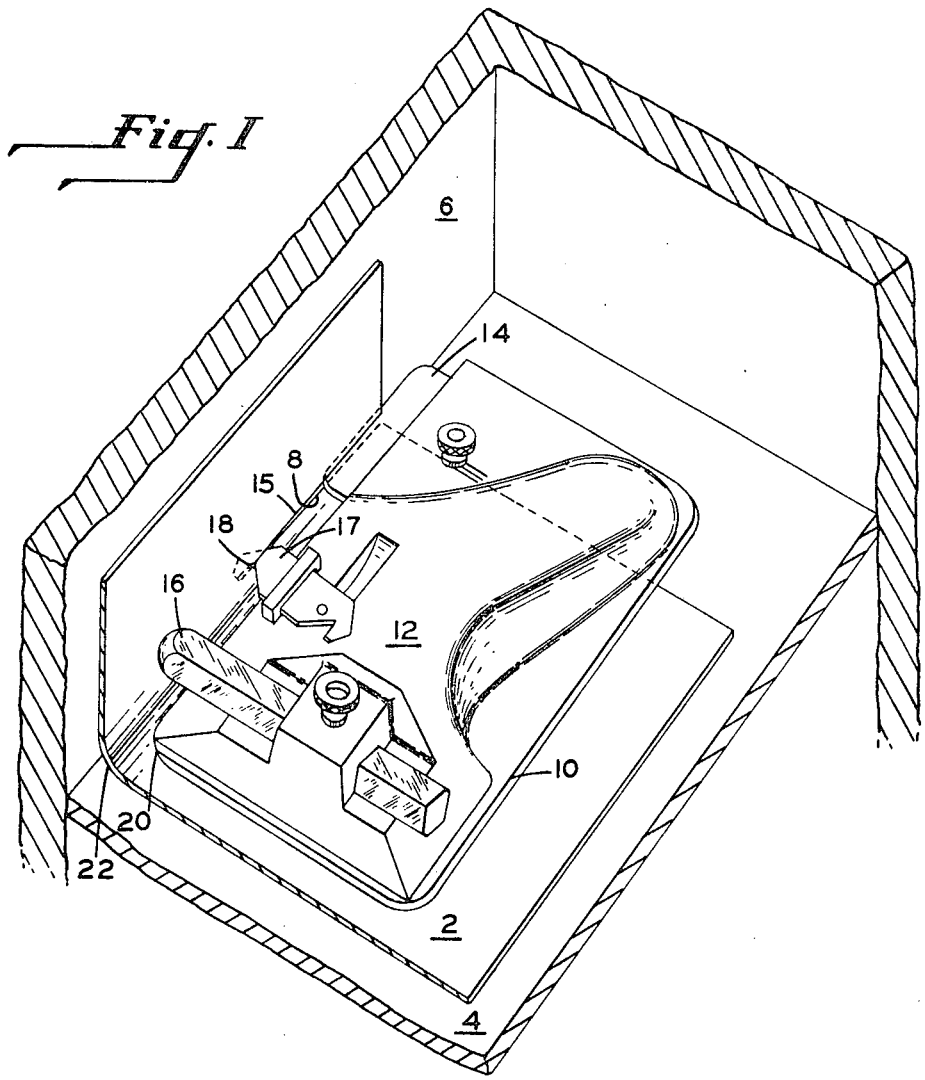
Fig. I
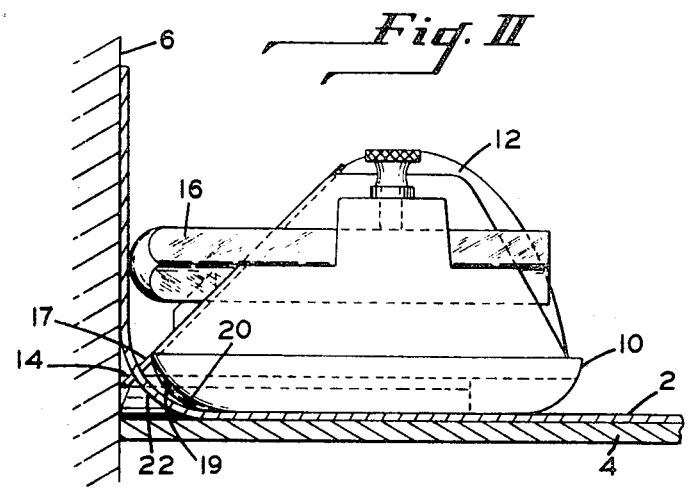
Fig. II
INVENTOR
RICHARD J. EVANS
Clifford B Price
ATTORNEY

WALL EDGE TRIMMER FOR HARD SURFACE FLOORING

BACKGROUND OF THE INVENTION

1. Field of the Invention

The invention relates to a tool for cutting the edge of the floor covering relative to a wall surface and, more particularly, to a tool for cutting hard surface flooring.

2. Description of the Prior Art

In the prior art in most cases, hard surface flooring was cut by laying a pattern out on a flat piece of flooring and cutting the flooring while it is in the flat state. Often a template or pattern was made, and this was used to lay out the edge on the hard surface flooring.

With carpet, cutting tools were used to cut the carpet in position. U.S. Pat. No. 3,395,453 shows one example of a carpet edge cutter. Here it can be seen that the base 24 clearly forces the carpet into a sharp right angle bend. A bend of this nature on a hard surface flooring would cause cracking in either the decorative surface or the base layer of the flooring. U.S. Pat. No. 2,607,115 shows another example of a carpet cutting tool. It should be noted that this particular tool requires that only a very short piece of waste material be left on the edge of the carpet. Also it should be noted that the cutting blade for this particular cutter is not particularly adapted for use on hard surface flooring.

The object herein is to provide a tool with a cutter and a shape which is particularly adapted for use with hard surface flooring. This type of flooring material is not carpeting, but is linoleum or vinyl sheet material.

SUMMARY OF THE INVENTION

The cutting tool has a base structure on which is mounted two guide elements and a cutting blade. The cutting blade has a notched cutting edge structure which has proven to be particularly useful in cutting hard surface flooring. A front guide member slides against the hard surface material while the back guide member slides against the wall and slips between the two cut edges of the flooring material. These two guide elements keep the cutter moving in a fixed position relative to the wall so that the cutter cuts the surface material to closely fit adjacent the wall. The base of the cutter is designed with an edge which forces and holds the hard surface material with a radius of curvature where the floor covering contacts both the floor and the wall.

BRIEF DESCRIPTION OF THE DRAWING

FIG. I is a perspective view showing the floor, wall, hard surface flooring and the cutting tool as operating on the flooring; and FIG. II is an end view of the tool in operating position.

DESCRIPTION OF THE PREFERRED EMBODIMENT

FIG. I shows the wall trimmer cutting a piece of hard surface material 2 which is laying on a floor 4 and is folded up adjacent a wall 6. The material is to be cut so that the edge 8 of the hard surface flooring will be closely adjacent the wall 6 when the hard surface material is resting on the floor 4. The wall trimmer is composed of a base member 10 which has a raised upper portion 12 forming a handle which may be grasped by the user to slide the wall trimmer relative to the wall. The wall trimmer has an adjustable rear guide 14 and an adjustable front guide 16.

As can be seen in the Figures, the rear guide 14 engages the wall surface 6 with its outer end and it can engage the wall surface because it slips in between the cut 15 formed in the hard surface flooring. A notched cutter 17 fastened to the tool cuts the floor material. The cutter has a notch 18 which is particularly suited for cutting hard surface flooring. The notched cutter is so positioned on the tool so that it will cut the hard surface material where it is bent as it moves from relative to the floor to relative to the wall. The cut is put at just the point on the bend so that, when the edge 8 of the flooring lays in position with the hard surface flooring flat on the floor, the edge 8 will be closely adjacent the wall 6. A front guide 16 is adjustable and is positioned against the surface of the hard surface flooring 2. The plane of the guide edge of the rear guide 14 and the plane of the nose of the front guide 16 are spaced from each other the distance of the thickness of the floor covering. Consequently, the two guides will be able to position the base of the tool relative to the wall so that the tool will move in a line parallel with the wall surface. This will then enable the cutter 17 to cut the hard surface material in a line which is also parallel to the wall surface.

Referring particularly to FIG. II, it will readily be seen the side of the wall trimmer adjacent the wall and the base of the wall trimmer are connected by a curved surface 19. The curved surface at the leading edge 20 of the base of the wall trimmer has a slightly larger radius than the curve farther down along the edge of the tool. Consequently, the base of the tool with its curved surface will generally force the hard surface flooring material into a curvature 22 relative to the tool. The hard surface material will then curve as it moves from a plane which includes the floor to the plane which includes the wall. This will prevent a sharp bend in the hard surface flooring. A sharp bend there would crack or damage the backing or wear surface of the hard surface flooring. The gentle curve is necessary to protect the hard surface flooring. The curve on the base of the tool forces the hard surface flooring into its desired curvature 22 so that the flooring is not damaged.

What is claimed is:

1. A wall trimmer comprising a base member which has a flat surface adapted to slide across a piece of hard surface flooring, a curved edge on the base member connecting the flat base of the base member and a side of the base member which will be positioned adjacent the wall along which the wall trimmer is to be moved, an adjustable guide means on the front portion of the base member and an adjustable guide means on the rear portion of the base member, both guide means extending beyond the base member on the side of the base member which has the curvature, a cutting tool positioned between the guide members and extending from the base member on the same side as the guide members, the rear guide member extending from the base member a slightly greater distance than the front guide member so that the front guide member may slide along the hard surface material which is laid adjacent a wall surface while the rear guide member slides against the wall between the cut in the flooring which is being formed by the cutting tool.

* * * * *